United States Patent
Sakura

(10) Patent No.: US 10,464,301 B2
(45) Date of Patent: Nov. 5, 2019

(54) THREE-DIMENSIONAL PRINTING SYSTEM, CONTROL DEVICE FOR THREE-DIMENSIONAL PRINTING APPARATUS, AND CONTROL METHOD FOR THREE-DIMENSIONAL PRINTING APPARATUS

(71) Applicant: Shozo Sakura, Kanagawa (JP)

(72) Inventor: Shozo Sakura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 243 days.

(21) Appl. No.: 15/258,177

(22) Filed: Sep. 7, 2016

(65) Prior Publication Data
US 2017/0072646 A1 Mar. 16, 2017

(30) Foreign Application Priority Data

Sep. 10, 2015 (JP) ................................. 2015-178734

(51) Int. Cl.
| | | |
|---|---|---|
| *B29C 67/00* | (2017.01) | |
| *B33Y 10/00* | (2015.01) | |
| *B33Y 30/00* | (2015.01) | |
| *B33Y 50/02* | (2015.01) | |

(Continued)

(52) U.S. Cl.
CPC .............. *B33Y 10/00* (2014.12); *B22F 3/008* (2013.01); *B22F 3/1055* (2013.01);
(Continued)

(58) Field of Classification Search
CPC ....................... B22F 2003/1057; B29C 64/386; B29C 64/40
See application file for complete search history.

(56) References Cited

U.S. PATENT DOCUMENTS

| | | |
|---|---|---|
| 5,740,051 A | 4/1998 | Sanders, Jr. et al. |
| 7,435,072 B2 | 10/2008 | Collins et al. |

(Continued)

FOREIGN PATENT DOCUMENTS

| | | |
|---|---|---|
| DE | 102013226670 A1 | 6/2014 |
| JP | 2004-358968 A | 12/2004 |

(Continued)

OTHER PUBLICATIONS

Extended European Search Report dated Jan. 20, 2017.

(Continued)

*Primary Examiner* — James Sanders
(74) *Attorney, Agent, or Firm* — Harness, Dickey & Pierce, P.L.C.

(57) ABSTRACT

A three-dimensional printing system includes a reservoir, a feeder, a solidifier, and a controller. The reservoir is configured to store powder, the powder being to be solidified inside the reservoir to form a three-dimensional object. The feeder is configured to move the powder from a predetermined location in a predetermined conveying direction, thereby feeding the powder to the reservoir. The solidifier is configured to perform a process of solidifying the powder in the reservoir in accordance with a control signal. The controller is configured to generate the control signal so as to form a first auxiliary object between the three-dimensional object and a wall surface of the reservoir, the wall surface being at a position downstream from the three-dimensional object in the conveying direction.

18 Claims, 15 Drawing Sheets

(51) Int. Cl.
- *B33Y 40/00* (2015.01)
- *B22F 3/105* (2006.01)
- *B22F 3/00* (2006.01)
- *B29C 64/165* (2017.01)
- *B29C 64/386* (2017.01)
- *B29C 64/40* (2017.01)
- *B29K 105/00* (2006.01)

(52) U.S. Cl.
CPC .......... *B29C 64/165* (2017.08); *B29C 64/386* (2017.08); *B29C 64/40* (2017.08); *B33Y 30/00* (2014.12); *B33Y 40/00* (2014.12); *B33Y 50/02* (2014.12); *B22F 2003/1057* (2013.01); *B22F 2999/00* (2013.01); *B29K 2105/251* (2013.01); *Y02P 10/295* (2015.11)

(56) References Cited

U.S. PATENT DOCUMENTS

| | | | |
|---|---|---|---|
| 9,636,870 | B2 | 5/2017 | Kuzusako et al. |
| 2011/0190446 | A1 | 8/2011 | Matsui et al. |
| 2013/0244040 | A1 | 9/2013 | Oshima |
| 2014/0175708 | A1 | 6/2014 | Echigo et al. |
| 2015/0210016 | A1 | 7/2015 | Okamoto |
| 2015/0343533 | A1 | 12/2015 | Park et al. |
| 2016/0067929 | A1 | 3/2016 | Park |
| 2016/0075084 | A1 | 3/2016 | Sakura |
| 2016/0075085 | A1 | 3/2016 | Sasaki |
| 2016/0214320 | A1 | 7/2016 | Sasaki et al. |
| 2016/0236422 | A1 | 8/2016 | Sakura |
| 2016/0243765 | A1 | 8/2016 | Sasaki et al. |
| 2016/0243805 | A1 | 8/2016 | Satoh |

FOREIGN PATENT DOCUMENTS

| | | |
|---|---|---|
| JP | 2011-156783 | 8/2011 |
| WO | WO-2009/145069 A1 | 12/2009 |

OTHER PUBLICATIONS

U.S. Appl. No. 15/183,141, filed Jun. 15, 2016.
U.S. Appl. No. 15/186,731, filed Jun. 20, 2016.
Japanese Office Action dated Jul. 16, 2019.

THREE-DIMENSIONAL PRINTING SYSTEM, CONTROL DEVICE FOR THREE-DIMENSIONAL PRINTING APPARATUS, AND CONTROL METHOD FOR THREE-DIMENSIONAL PRINTING APPARATUS

CROSS-REFERENCE TO RELATED APPLICATIONS

The present application claims priority under 35 U.S.C. § 119 to Japanese Patent Application No. 2015-178734, filed Sep. 10, 2015. The contents of which are incorporated herein by reference in their entirety.

BACKGROUND OF THE INVENTION

1. Field of the Invention

The present invention relates generally to a three-dimensional (3D) printing system, a control device for the 3D printing apparatus, and a control method for the 3D printing apparatus.

2. Description of the Related Art

Powder-bed-based layered manufacturing is known as a method of manufacturing a 3D object. Powder-bed-based layered manufacturing is a method of manufacturing an intended 3D object in a container by repeating a process of feeding a predetermined amount of material powder to the container and a process of solidifying a predetermined part of the fed powder.

For example, an apparatus that, for the purpose of eliminating wasting powder (more specifically, eliminating the need of evenly filling the container with the powder), forms not only an object body but also a frame surrounding the body is disclosed in Japanese Unexamined Patent Application Publication No. 2011-156783.

Feeding powder into the container may be performed by conveying the powder from a predetermined location to the container. In such a case, a pressure will be applied from the powder newly conveyed into the container to powder that is already stored in the container and to a 3D object that is already formed. A pressure and/or vibrations may also be applied to the powder to manufacture a highly-dense 3D object. For these reasons, the position of the 3D object in the container can be disadvantageously displaced when powder is fed.

Therefore, there is a need to prevent displacement of a 3D object that can occur when powder is fed.

SUMMARY OF THE INVENTION

According to one aspect of the present invention, a three-dimensional printing system includes a reservoir, a feeder, a solidifier, and a controller. The reservoir is configured to store powder, the powder being to be solidified inside the reservoir to form a three-dimensional object. The feeder is configured to move the powder from a predetermined location in a predetermined conveying direction, thereby feeding the powder to the reservoir. The solidifier is configured to perform a process of solidifying the powder in the reservoir in accordance with a control signal. The controller is configured to generate the control signal so as to form a first auxiliary object between the three-dimensional object and a wall surface of the reservoir, the wall surface being at a position downstream from the three-dimensional object in the conveying direction.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
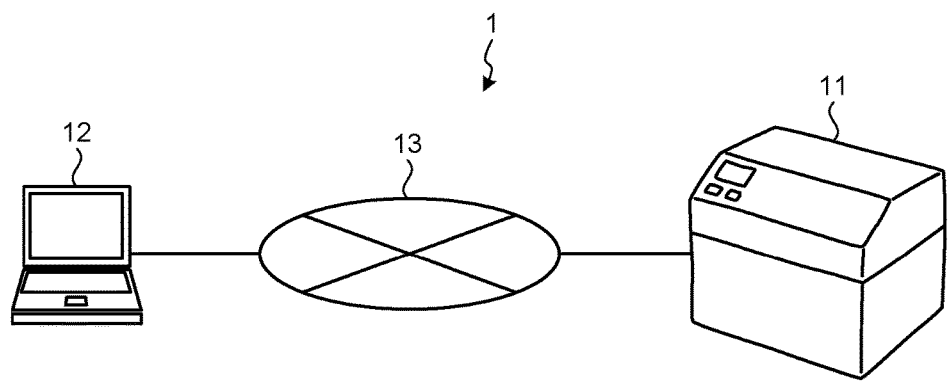
FIG. 1 is a diagram illustrating a hardware configuration of a 3D printing system according to an embodiment.

The terminology used herein is for the purpose of describing particular embodiments only and is not intended to be limiting of the present invention.

As used herein, the singular forms "a", an and the are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

Exemplary embodiments of the present invention are described in detail below with reference to the accompanying drawings.

FIG. 1 is a diagram illustrating a hardware configuration of a three-dimensional (3D) printing system 1 according to an embodiment. The 3D printing system 1 includes a 3D printing apparatus (hereinafter, simply referred to as "printing apparatus") 11, an information processing terminal 12, and a network 13.

The printing apparatus 11 is an apparatus that forms a 3D object of a desired shape by powder-bed-based layered manufacturing. Powder-bed-based layered manufacturing is a method of manufacturing an intended 3D object in a container by repeating a process of feeding a predetermined amount of material powder to the container and a process of solidifying a predetermined part of the fed powder.

The information processing terminal 12 is a device that generates a control signal for controlling the printing apparatus 11. The information processing terminal 12 may be, but not limited to, a general-purpose computer, a tablet computer, a smartphone, or the like.

The network 13 is a known or novel computer network that allows the printing apparatus 11 and the information processing terminal 12 to mutually transmit and receive signals.

Figure 2:
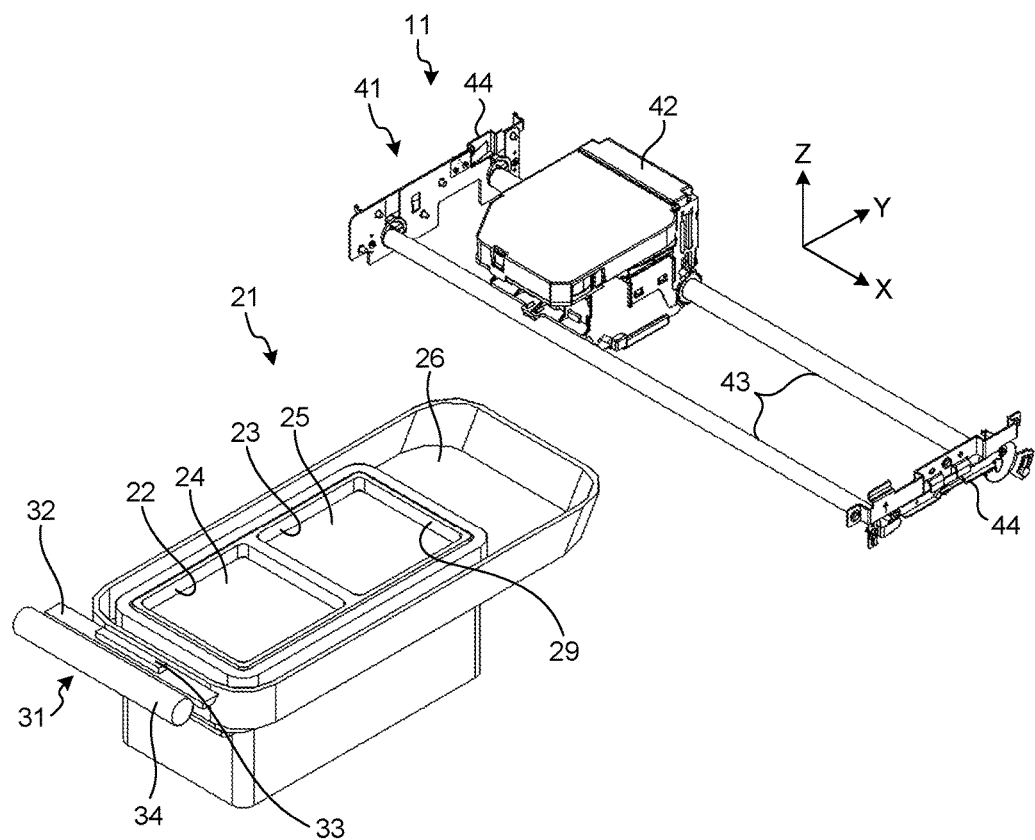
FIG. 2 is a diagram illustrating a hardware configuration of a printing apparatus according to the embodiment.

FIG. 2 is a diagram illustrating a hardware configuration of the printing apparatus 11 according to the embodiment. The printing apparatus 11 includes a reservoir unit 21 (reservoir), a recoater unit 31 (feeder), and an ejection head unit 41 (solidifier).

The reservoir unit 21, which is a unit that stores powder, includes a feed chamber 22, a build chamber 23, a feed stage 24, a build stage 25, and a receiving member 26.

The feed chamber 22 is a member that stores powder not yet fed to the build chamber 23. The feed stage 24, which is movable in the directions parallel to the Z direction, is installed in the feed chamber 22. The volume of the feed chamber 22 changes as the feed stage 24 is elevated or lowered.

The build chamber 23 is a member that stores powder fed from the feed chamber 22. A 3D object is to be formed in the build chamber 23. The build stage 25, which is movable in the directions parallel to the Z direction, is installed in the build chamber 23. The volume of the build chamber 23 changes as the build stage 25 is elevated or lowered. The build chamber 23 has a wall surface 29 at an end in a powder conveying direction (the Y direction).

The receiving member 26 is a member that stores powder spilled from the feed chamber 22 and the build chamber 23.

The recoater unit 31 is a unit that repeatedly conveys a predetermined amount of powder from the feed chamber 22 to the build chamber 23, thereby depositing layers of the powder in the build chamber 23. The recoater unit 31 includes a blade 32, an actuator 33, and a roller 34.

The blade 32 is a rod-like member having an inverted substantially trapezoidal cross section. The blade 32 is longitudinally laid along the X direction and movable in the directions parallel to the Y direction. The blade 32 is moved in the Y direction to convey powder, which has been pushed up above a top surface of the feed chamber 22 by an ascent of the feed stage 24, to the build chamber 23. The amount of powder fed to the build chamber 23 is controllable by controlling ascent of the feed stage 24.

The actuator 33 is a device that vibrates the blade 32. The actuator 33 acts to impart vibrations to the powder in the build chamber 23 and tap the powder with the blade 32, thereby compressing the powder.

The roller 34, which is a rotatable cylindrical member, is longitudinally laid along the X direction and is movable in the directions parallel to the Y direction. It is possible to compress the powder or remove excess powder by causing the roller 34 to pass through top portions of the feed chamber 22 and the build chamber 23.

The ejection head unit 41 is a unit that ejects a binder liquid that solidifies the powder to a predetermined position in the build chamber 23 and includes an ejection head 42, rails 43, and supports 44.

The ejection head 42 is a unit including a mechanism for internally storing the binder liquid, a mechanism for ejecting the binder liquid, and a mechanism for moving on the rails 43. The ejection head 42 is coupled to the rails 43 that are longitudinally laid along the X direction and movable in the directions parallel to the X direction. The supports 44 supporting the rails 43 are movable in the directions parallel to the Y direction and the directions parallel to the Z direction. Hence, the ejection head 42 can move three dimensionally. The position of the ejection head 42 and an ejection amount of the binder liquid are controlled in accordance with the control signal fed from the information processing terminal 12.

Figure 3:
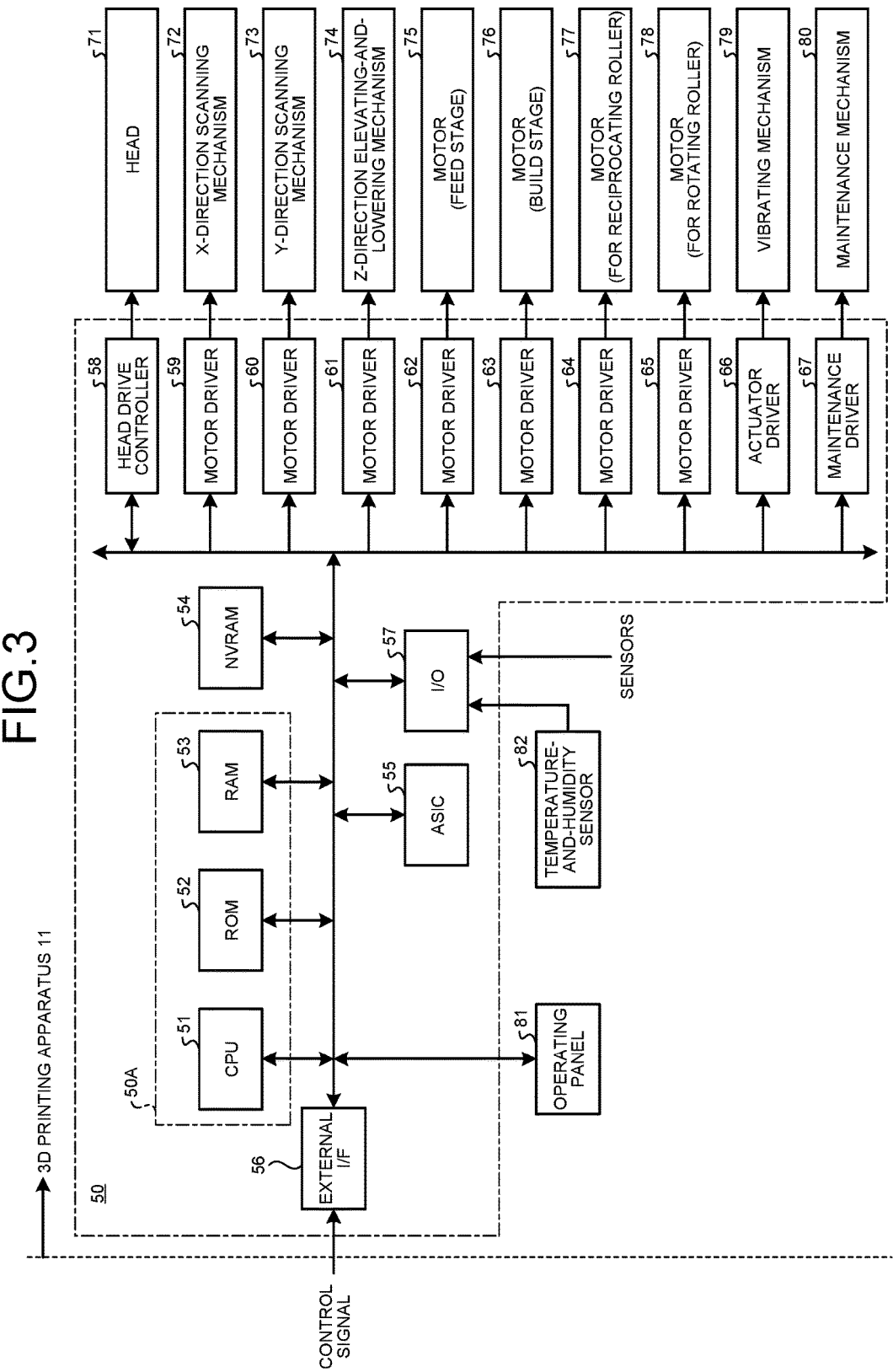
FIG. 3 is a diagram illustrating an internal hardware configuration of the printing apparatus according to the embodiment.

FIG. 3 is a diagram illustrating an internal hardware configuration of the printing apparatus 11 according to the embodiment.

A building controller 50 of the printing apparatus 11 includes a main controller 50A. The main controller 50A includes a CPU (Central Processing Unit) 51 that manages overall control of the printing apparatus 11, a ROM (Read Only Memory) 52 that stores program instructions for controlling the CPU 51 and other specific data, and a RAM (Random Access Memory) 53 that temporarily stores 3D object data and the like.

The building controller 50 further includes a nonvolatile memory (NVRAM (Non Volatile RAM)) 54, an ASIC (Application Specific Integrated Circuit) 55, an external I/F (Interface) 56, and an I/O (Input/Output) 57. The NVRAM 54 is a memory for holding data even after the apparatus is powered off. The ASIC 55 performs image processing on 3D object data, input/output signal processing for overall control of the apparatus, and the like. The external I/F 56 receives the control signal output from the information processing terminal 12. The I/O 57 receives detection signals output from various sensors including a temperature-and-humidity sensor 82.

The building controller 50 further includes a head drive controller 58 that controls driving of a head 71 contained in the ejection head 42. The building controller 50 includes a motor driver 59 that drives an X-direction scanning mechanism 72 that moves the ejection head 42 in the directions parallel to the X direction, a motor driver 60 that drives a Y-direction scanning mechanism 73 that moves the ejection head 42 (the supports 44) in the directions parallel to the Y direction, and a motor driver 61 that drives a Z-direction elevating-and-lowering mechanism 74 that moves (elevates/lowers) the ejection head 42 in the directions parallel to the Z direction.

The building controller 50 further includes a motor driver 62 that drives a motor 75 that elevates/lowers the feed stage 24 and a motor driver 63 that drives a motor 76 that elevates/lowers the build stage 25.

The building controller 50 further includes a motor driver 64 that drives a motor 77 that moves the recoater unit 31 in the directions parallel to the Y direction, a motor driver 65 that drives a motor 78 that rotates the roller 34, and an actuator driver 66 that drives a vibrating mechanism 79 that includes the actuator 33.

The building controller 50 further includes a maintenance driver 67 that drives a maintenance mechanism 80 that performs cleaning of the ejection head 42 and the like.

A detection signal output from the temperature-and-humidity sensor 82, which detects the temperature and the humidity as an environmental condition, and the like are fed to the I/O 57. An operating panel 81 for entering and displaying information necessary for the printing apparatus 11 is connected to the building controller 50.

Figure 4:
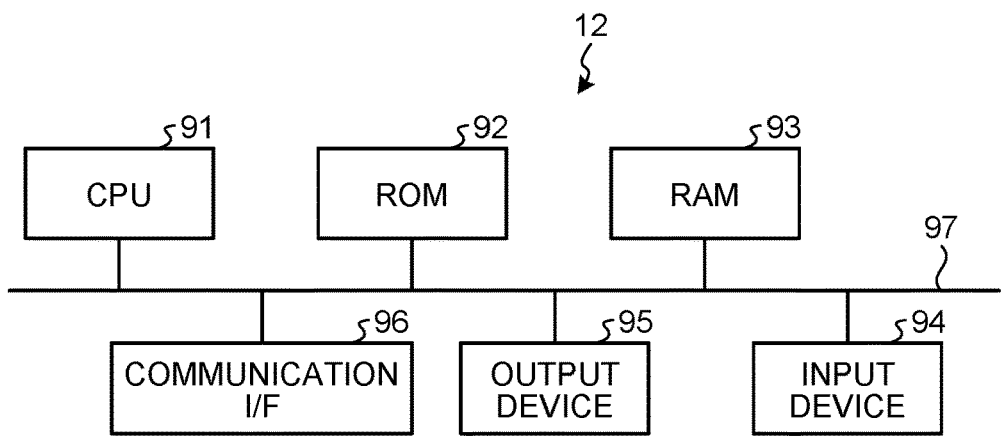
FIG. 4 is a schematic diagram illustrating a hardware configuration of an information processing terminal according to the embodiment.

FIG. 4 is a schematic diagram illustrating a hardware configuration of the information processing terminal 12 according to the embodiment. The information processing terminal 12 includes a CPU 91, a ROM 92, a RAM 93, an input device 94, an output device 95, a communication I/F 96, and a bus 97. The CPU 91 performs predetermined computations in accordance with control program instructions stored in the ROM 92 by using the RAM 93 as a work area. The input device 94 is a device for use in externally entering information. Examples of the input device 94 include a keyboard, a mouse, and a touch panel. The output device 95 is a device for externally outputting information generated internally. Examples of the output device 95 include a display. The communication I/F 96 is a device that enables transmitting and receiving signals to and from the printing apparatus 11 and the like over the network 13.

Figure 5:
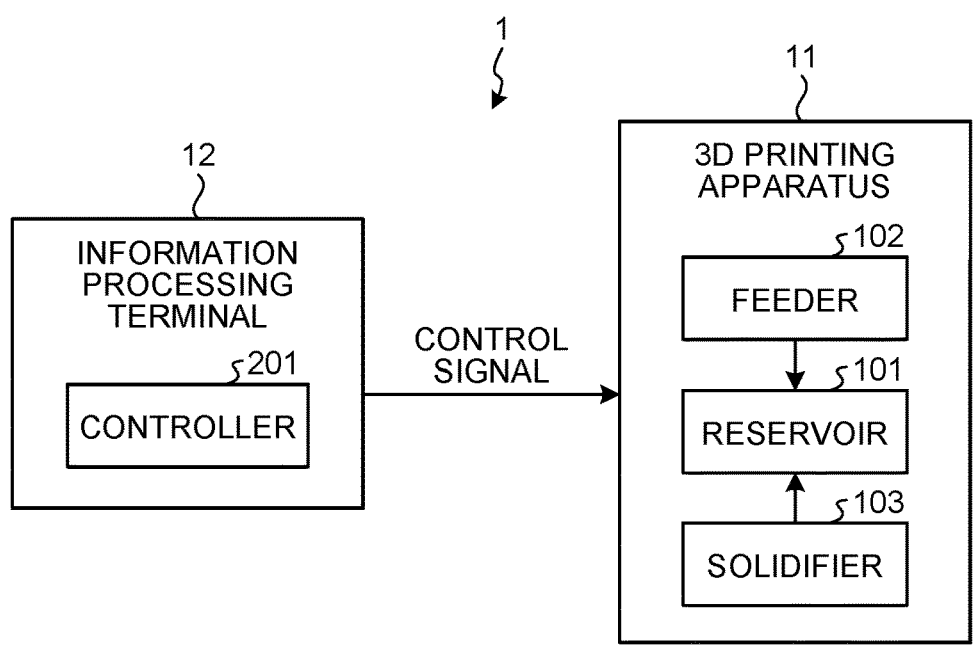
FIG. 5 is a diagram illustrating a functional configuration of the 3D printing system according to the embodiment.

FIG. 5 is a diagram illustrating a functional configuration of the 3D printing system 1 according to the embodiment. The printing apparatus 11 includes a reservoir 101, a feeder 102, and a solidifier 103. The information processing terminal 12 includes a controller 201.

The reservoir 101 stores powder fed from a predetermined location (in the example structure illustrated in FIG. 2, the feed chamber 22). The powder is solidified inside the reservoir 101 to form a 3D object. The reservoir 101 can be embodied in, but not limited to, such a structure as the build chamber 23 of the reservoir unit 21.

The feeder 102 moves powder from the predetermined location (the feed chamber 22) in a predetermined conveying direction (the Y direction), thereby feeding the powder to the reservoir 101 (the build chamber 23). The feeder 102 can be embodied in, but not limited to, such a structure as the recoater unit 31.

The solidifier 103 performs a process of solidifying the powder in the reservoir 101 in accordance with the control signal output from the information processing terminal 12. Specifically, the solidifier 103 solidifies the powder in the reservoir 101 in accordance with information contained in the control signal so that a predetermined 3D object is formed. The solidifier 103 can be embodied in, but not limited to, such a structure as the ejection head unit 41.

The controller 201 generates the control signal and outputs it to the printing apparatus 11. The control signal contains information for controlling the solidifier 103. Examples of the information include building data obtained by slicing the 3D object to be formed in the reservoir 101 on a per-build-layer basis and the shape, size, and colors of the 3D object. The controller 201 generates the control signal so as to form not only the intended 3D object but also an auxiliary object. The auxiliary object is an object for preventing the intended 3D object from being displaced in the powder conveying direction inside the reservoir 101. The controller 201 generates the control signal so as to form the auxiliary object between the 3D object and a wall surface, which is at a position downstream from the 3D object in the powder conveying direction, of the reservoir 101. The controller 201 can be implemented by, but not limited to, cooperation of the CPU 91, the control program instructions stored in the ROM 92, the RAM 93 functioning as the work area, an appropriate logic IC (Integrated Circuit), and the like.

The control program instructions implementing the functions of the controller 201 can be provided as an installable file or an executable file recorded in a non-transitory computer-readable recording medium, such as CD-ROM, a flexible disk (FD), a CD-R, and a DVD (Digital Versatile Disk).

The control program instructions may be configured to be stored in a computer (server) connected to the network 13, which may be the Internet, and provided by being downloaded over the network 13. The control program instructions may be configured to be provided or delivered over the network 13. The control program instructions may be configured to be provided in a form of preinstalled in the ROM 92 or the like.

The control program instructions may be in a module configuration including functional units for generating the control signal. In this case, the CPU 91 reads out the control program instructions from the ROM 92 and executes them, thereby loading the functional units on the RAM 93 and generating the functional units on the RAM 93.

Figure 6:
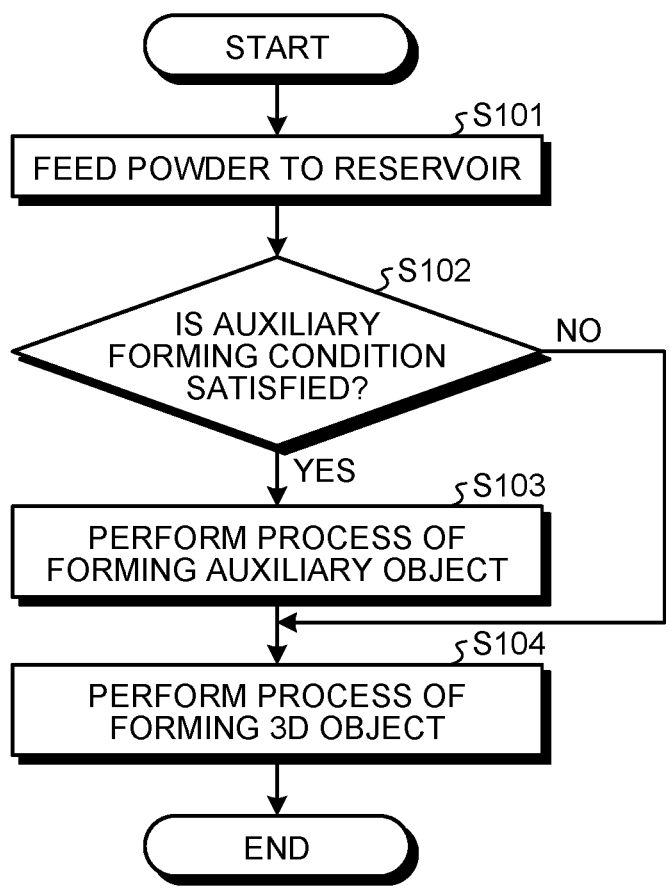
FIG. 6 is a flowchart illustrating a procedure of a process performed by the 3D printing system according to the embodiment.

FIG. 6 is a flowchart illustrating a procedure of a process performed by the 3D printing system 1 according to the embodiment. First, the feeder 102 feeds powder to the reservoir 101 (S101). According to the example structure illustrated in FIG. 2, the powder is fed to the build chamber 23 by, after the powder has been pushed up above the top surface of the feed chamber 22 by the feed stage 24, moving the recoater unit 31 in the Y direction.

Thereafter, the controller 201 determines whether or not an auxiliary forming criterion is satisfied (S102). The auxiliary forming criterion is a criterion for determining whether or not to form an auxiliary object and can be determined on the basis of likelihood that an intended 3D object will be displaced in the powder conveying direction (the Y direction). Conceivable examples of the auxiliary forming criterion include that a clearance between a 3D object and the wall surface 29 of the build chamber 23 is larger than a predetermined value, that a clearance between a plurality of parts belonging to a single 3D object and adjacent to each other in the powder conveying direction is larger than a predetermined value, and that a clearance between a plurality of 3D objects adjacent to each other in the powder conveying direction is larger than a predetermined value. In the present embodiment, it is assumed that the auxiliary forming criterion is satisfied when it is determined that it is necessary to form the auxiliary object (i.e., displacement of the 3D object is likely to occur).

If the auxiliary forming criterion is satisfied (YES at S102), after a process of forming the auxiliary object is performed (S103), a regular process of forming the 3D object is performed (S104). Specifically, if the auxiliary forming criterion is satisfied, the controller 201 generates the control signal so as to form not only the intended 3D object but also the auxiliary object. On the other hand, if the auxiliary forming criterion is not satisfied (NO at S102), only the regular process of forming the 3D object is performed (S104).

Figure 7:
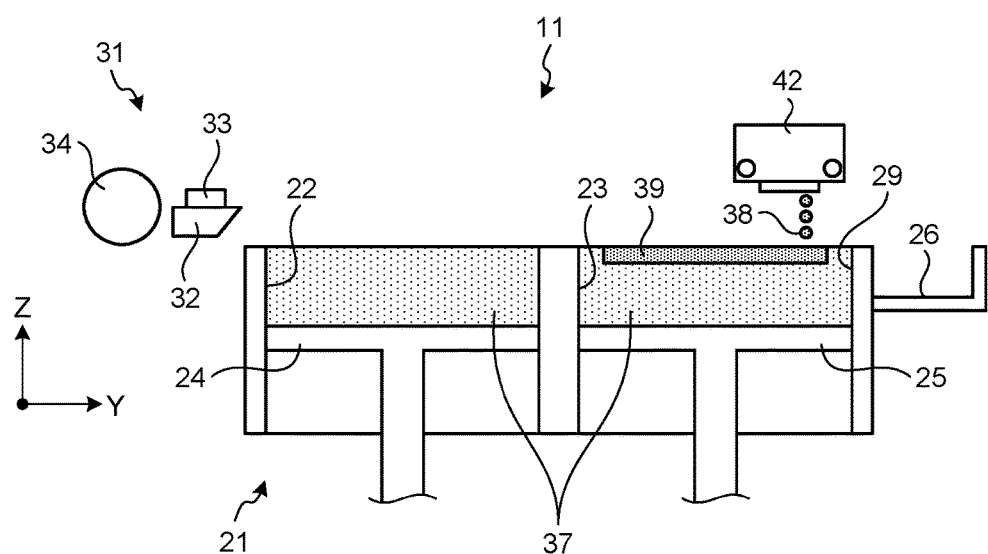
FIG. 7 is a diagram illustrating a process of forming a 3D object according to the embodiment.

FIG. 7 is a diagram illustrating a process of forming a 3D object 39 according to the embodiment. FIG. 7 illustrates a state where the ejection head 42 is ejecting a binder liquid 38 to powder 37 stored in the build chamber 23. The powder 37, to which the binder liquid 38 is ejected, is solidified to form a portion of the intended 3D object 39.

Figure 8:
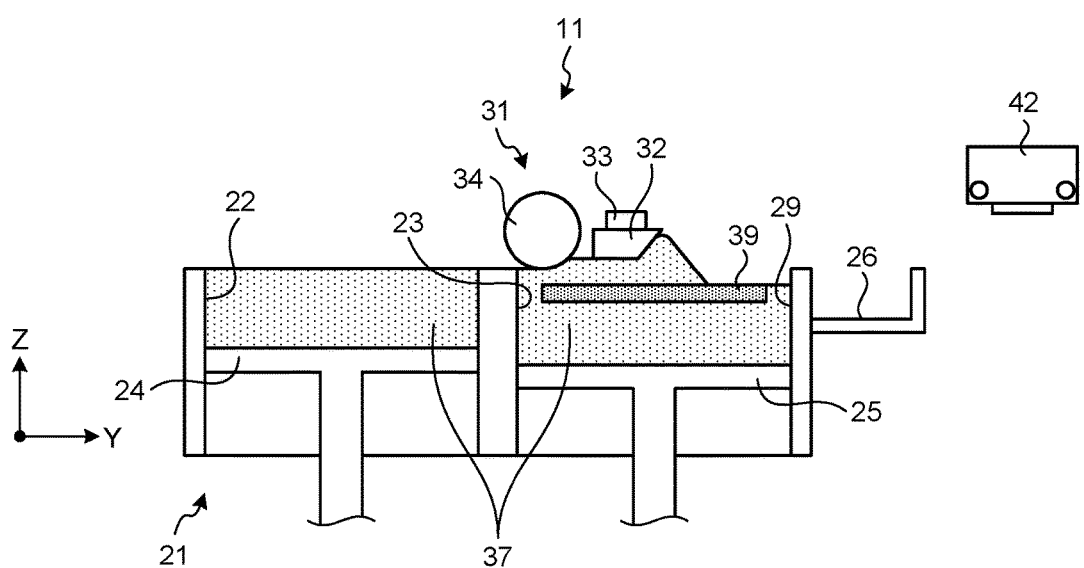
FIG. 8 is a diagram illustrating a powder feeding process according to the embodiment.

FIG. 8 is a diagram illustrating a process of feeding the powder 37 according to the embodiment. FIG. 8 illustrates a state where the recoater unit 31 conveys the powder 37 from the feed chamber 22 to the build chamber 23, causing the top of the 3D object 39 to be recoated with a layer of the powder 37. First, the build stage 25 is lowered depending on the amount of the powder 37 to be fed. Thereafter, after the powder 37 is pushed up above the top surface of the feed chamber 22 by an ascent of the feed stage 24, the powder 37 is conveyed by the blade 32 of the recoater unit 31 in the Y direction to be deposited on the 3D object 39 in the build chamber 23. At this time, the blade 32 applies vibrations and a pressure to the powder 37 in the build chamber 23. The roller 34 removes excess amounts of the powder 37 from the feed chamber 22 and the build chamber 23. These make the powder in the build chamber 23 highly dense and flat.

First Implementation Example

Figure 9:
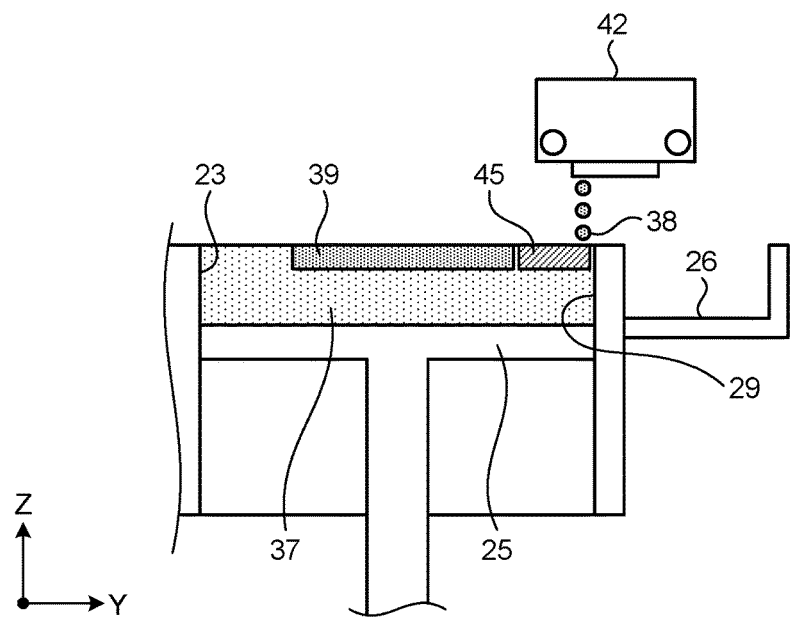
FIG. 9 is a diagram illustrating a process of forming the 3D object and an auxiliary object according to a first implementation example of the embodiment.
Figure 10:
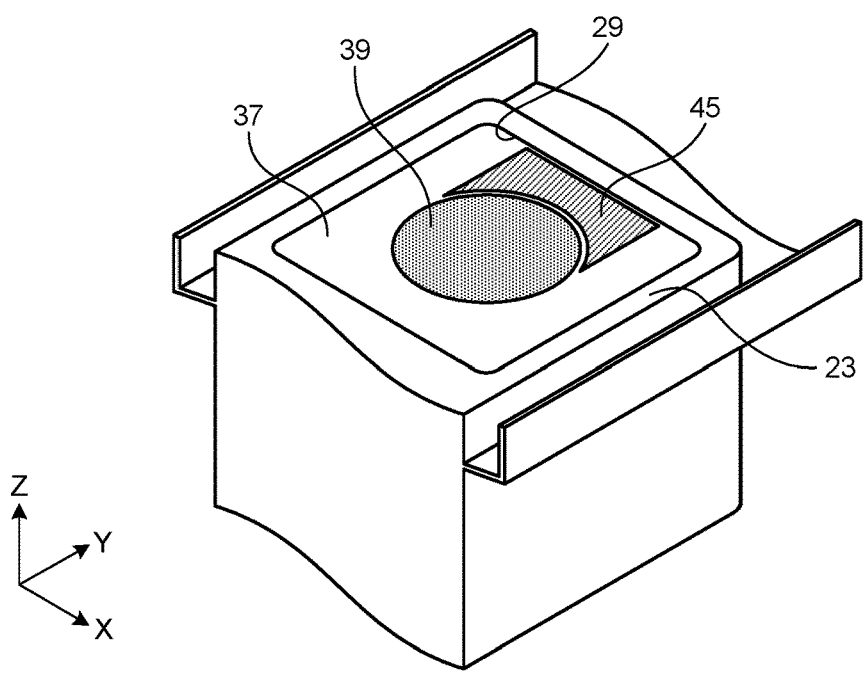
FIG. 10 is a diagram illustrating an appearance of a top surface of a build chamber after the process illustrated in FIG. 9.

FIG. 9 is a diagram illustrating a process of forming the 3D object 39 and an auxiliary object 45 according to a first implementation example of the embodiment. FIG. 10 is a diagram illustrating an appearance of the top surface of the build chamber 23 after the process illustrated in FIG. 9.

FIG. 9 illustrates a state where the auxiliary object 45 is formed between the intended 3D object 39 and the wall surface 29 of the build chamber 23. The wall surface 29 is one, which is at a position downstream from the 3D object 39 in the conveying direction (the Y direction) of the powder 37, of inner wall surfaces of the build chamber 23. The auxiliary object 45 prevents the 3D object 39 from being displaced toward the wall surface 29 during the feeding process of the powder 37.

The auxiliary object 45 is formed only when the above-described auxiliary forming criterion is satisfied. For example, the auxiliary object 45 is formed when the clearance between the 3D object 39 and the wall surface 29 is larger than the predetermined value. Hence, because forming the auxiliary object 45 even in a case where displacement of the 3D object 39 is less likely to occur can be prevented, consumptions of the powder 37 and the binder liquid 38 can be reduced.

It is preferable that a predetermined clearance is provided between the 3D object 39 and the auxiliary object 45. It is preferable that a predetermined clearance is provided also between the auxiliary object 45 and the wall surface 29. These clearances facilitate separating the completed 3D object 39, removing the auxiliary object 45, and the like.

FIG. 10 illustrates relationship between the shape of the 3D object 39 and the shape of the auxiliary object 45. The 3D object 39 of the first implementation example is cylindrical. The surface of the auxiliary object 45 facing the 3D object 39 is curved along a curved surface of the 3D object 39. It is preferable to determine the shape of the auxiliary object 45 depending on the shape of the 3D object 39 in this manner.

Second Implementation Example

Figure 11:
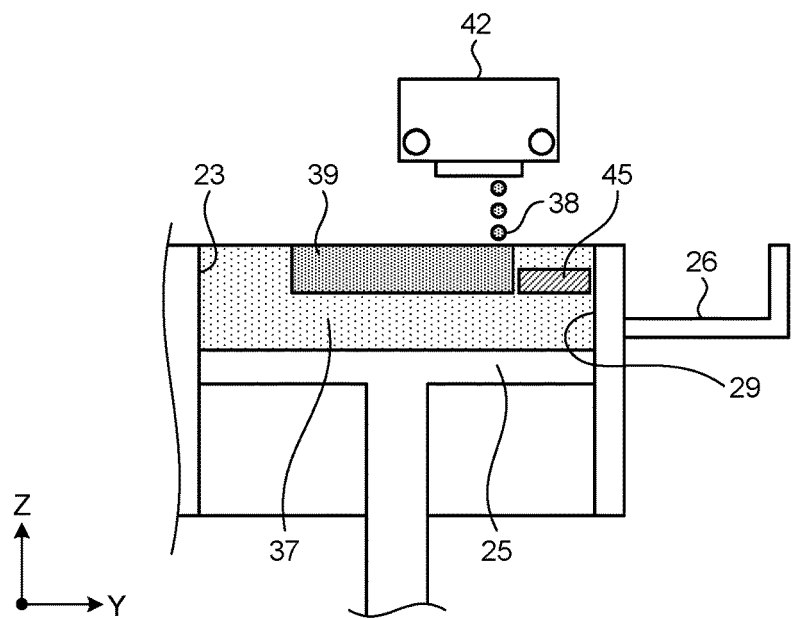
FIG. 11 is a diagram illustrating a process of forming the 3D object and the auxiliary object according to a second implementation example of the embodiment.
Figure 12:
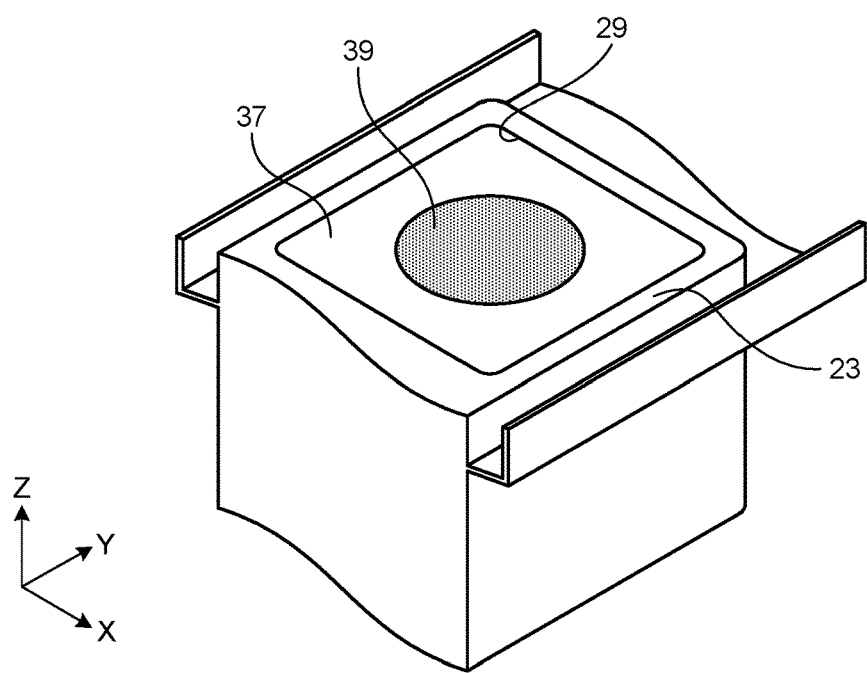
FIG. 12 is a diagram illustrating an appearance of the top surface of the build chamber after the process illustrated in FIG. 11.

FIG. 11 is a diagram illustrating a process of forming the 3D object 39 and the auxiliary object 45 according to a second implementation example of the embodiment. FIG. 12 is a diagram illustrating an appearance of the top surface of the build chamber 23 after the process illustrated in FIG. 11.

Referring to FIG. 11, the length of the auxiliary object 45 in the Z direction is smaller than the length of the 3D object 39 in the Z direction. The length of the auxiliary object 45 in the Z direction is thus not necessarily the same as the overall length of the 3D object 39 in the Z direction. Even when the length of the auxiliary object 45 in the Z direction is smaller than that of the 3D object 39, the auxiliary object 45 can prevent displacement of the 3D object 39.

Third Implementation Example

FIG. 13 to FIG. 16 are diagrams illustrating a process of forming the 3D object 39 and the auxiliary object 45 according to a third implementation example of the embodiment.

Figure 13:
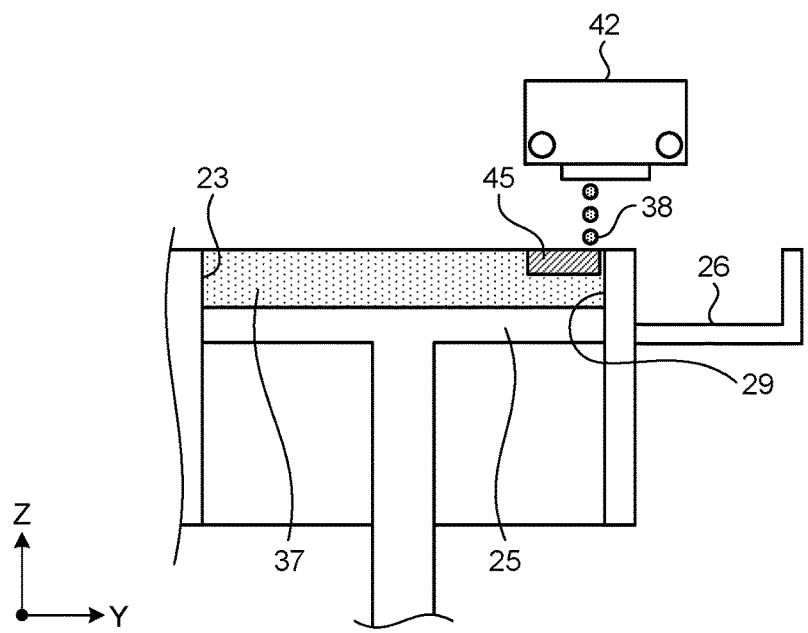
FIG. 13 is a diagram illustrating a process of forming the 3D object and the auxiliary object according to a third implementation example of the embodiment.
Figure 14:
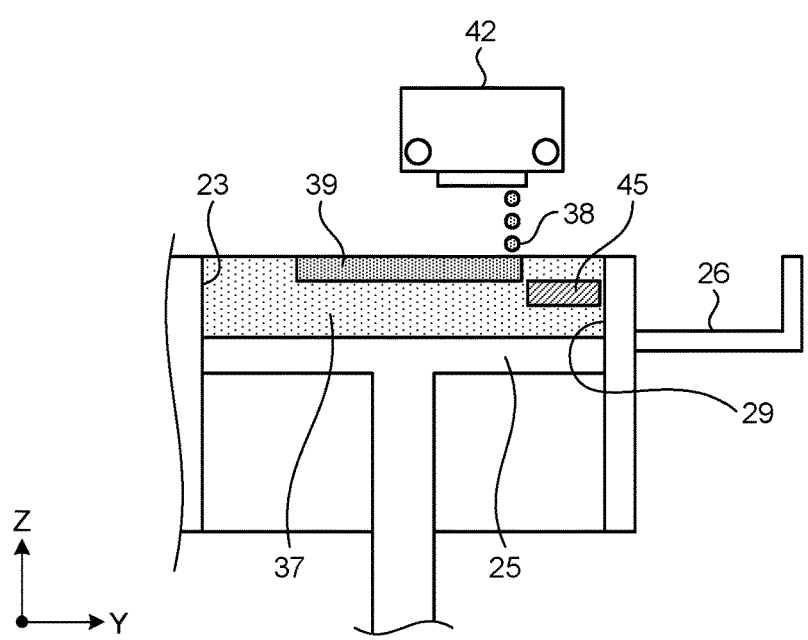
FIG. 14 is a diagram illustrating the process of forming the 3D object and the auxiliary object according to the third implementation example of the embodiment.
Figure 15:
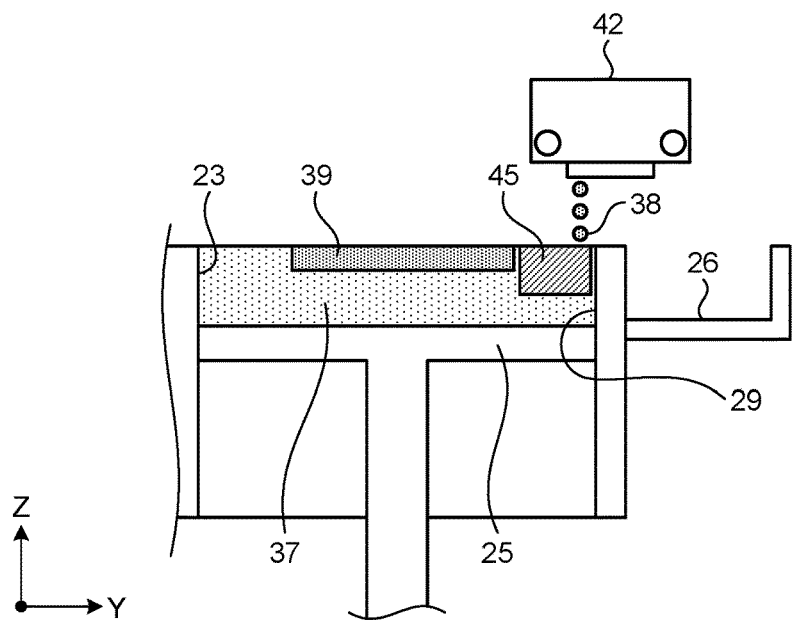
FIG. 15 is a diagram illustrating the process of forming the 3D object and the auxiliary object according to the third implementation example of the embodiment.
Figure 16:
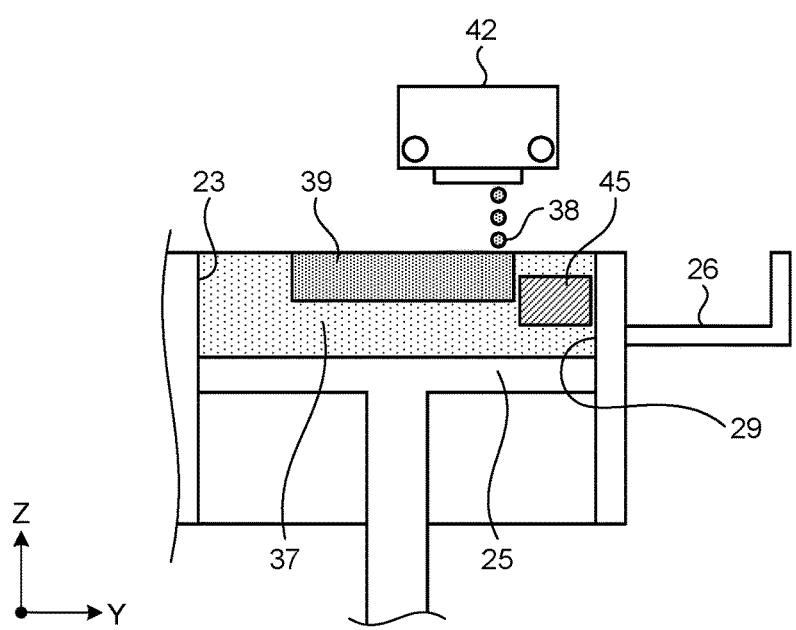
FIG. 16 is a diagram illustrating the process of forming the 3D object and the auxiliary object according to the third implementation example of the embodiment.

FIG. 13 illustrates a state where a portion (lower end portion) of the auxiliary object 45 is formed prior to the 3D object 39. FIG. 14 illustrates a state where a portion (lower end portion) of the 3D object 39 is formed after the lower end portion of the auxiliary object 45 has been formed. FIG. 15 illustrates a state where a new layer is formed on the already-formed auxiliary object 45 illustrated in FIG. 14. FIG. 16 illustrates a state where a new layer is formed on the already-formed 3D object 39 illustrated in FIG. 15.

The above-described processes cause the lower end portion of the auxiliary object 45 to project further toward the bottom of the build chamber 23 than the lower end portion of the 3D object 39 does. If the 3D object 39 and the auxiliary object 45 are formed simultaneously from the first layer as in the example illustrated in FIG. 9 or FIG. 11, because the thickness (the length in the Z direction) of the auxiliary object 45 is one layer when recoating for the second layer is performed, the effect of preventing displacement can be insufficient. In contrast, by starting forming the auxiliary object 45 before forming the 3D object 39 as in the third implementation example illustrated in FIG. 13 to FIG. 16, it is possible to prepare the auxiliary object 45 having a sufficient thickness before recoating which is performed after forming the formed 3D object 39. Consequently, the effect of preventing displacement of the 3D object 39 can be increased. It is preferable that a predetermined clearance is provided between the lower end portion of the auxiliary object 45 and the bottom of the build chamber 23 (i.e., the top surface of the build stage 25). This clearance facilitates removing the auxiliary object 45.

Fourth Implementation Example

Figure 17:
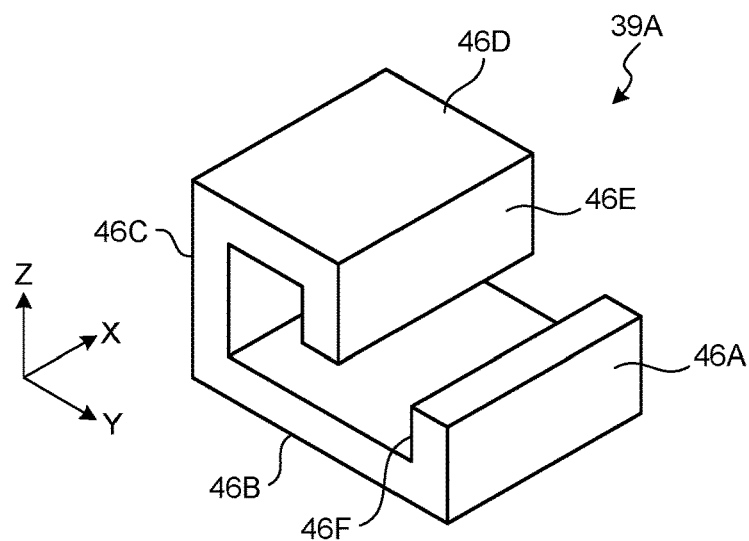
FIG. 17 is a diagram illustrating a 3D object according to a fourth implementation example of the embodiment.

FIG. 17 is a diagram illustrating a 3D object 39A according to a fourth implementation example of the embodiment. The 3D object 39A of the fourth implementation example includes a first surface 46A, a second surface 46B, a third surface 46C, a fourth surface 46D, a fifth surface 46E, and a sixth surface 46F. The first surface 46A and the fifth surface 46E face the wall surface 29 of the build chamber 23.

FIG. 18 to FIG. 22 are diagrams illustrating a process of forming the 3D object 39A, a first auxiliary object 45A, and a second auxiliary object 45B according to the fourth implementation example of the embodiment.

Figure 18:
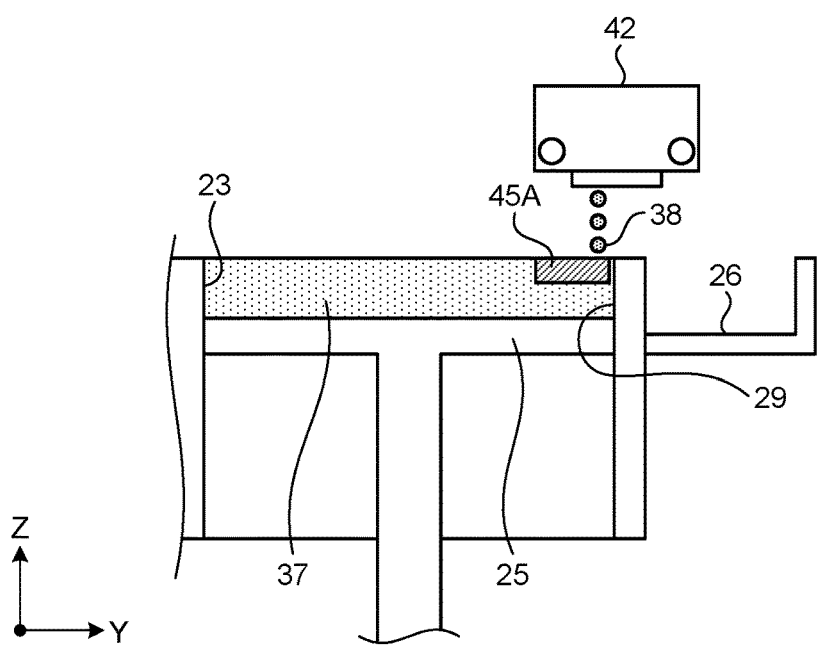
FIG. 18 is a diagram illustrating a process of forming the 3D object, a first auxiliary object, and a second auxiliary object according to the fourth implementation example of the embodiment.
Figure 19:
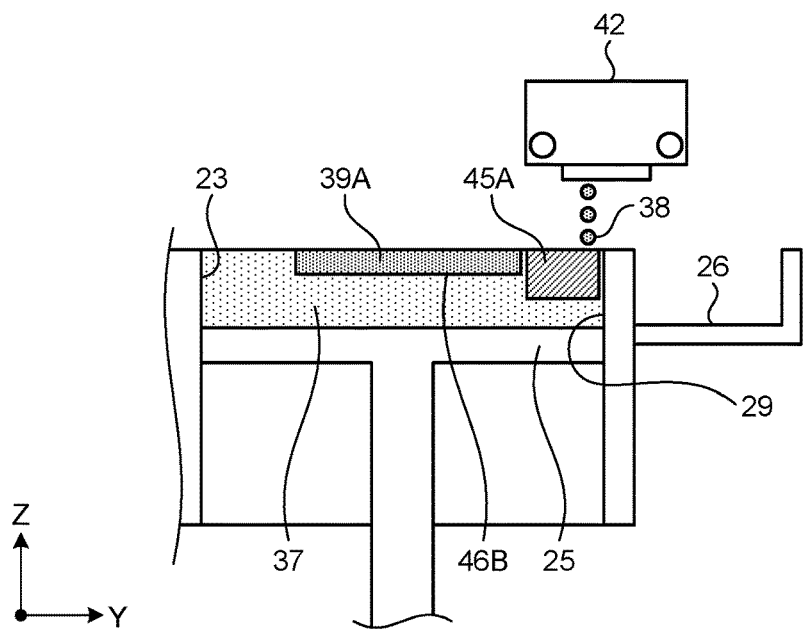
FIG. 19 is a diagram illustrating the process of forming the 3D object, the first auxiliary object, and the second auxiliary object according to the fourth implementation example of the embodiment.
Figure 20:
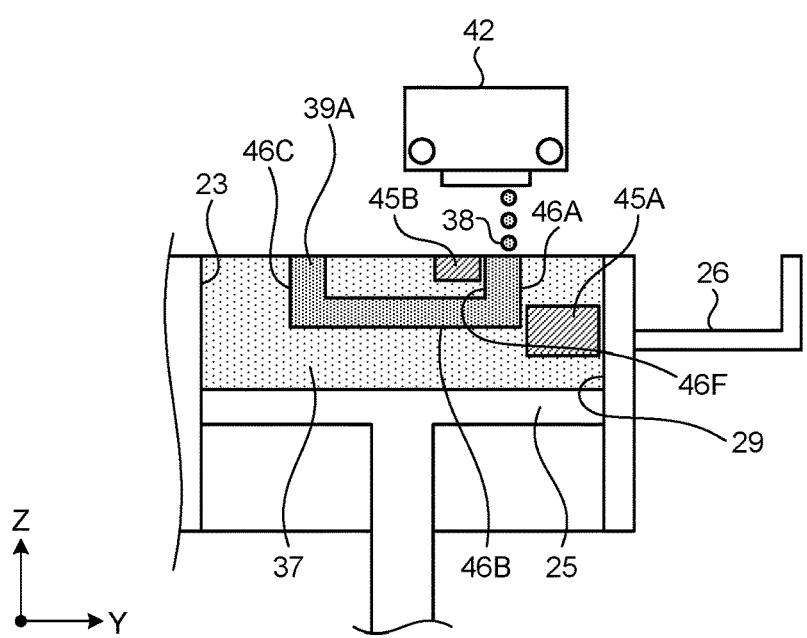
FIG. 20 is a diagram illustrating the process of forming the 3D object, the first auxiliary object, and the second auxiliary object according to the fourth implementation example of the embodiment.
Figure 21:
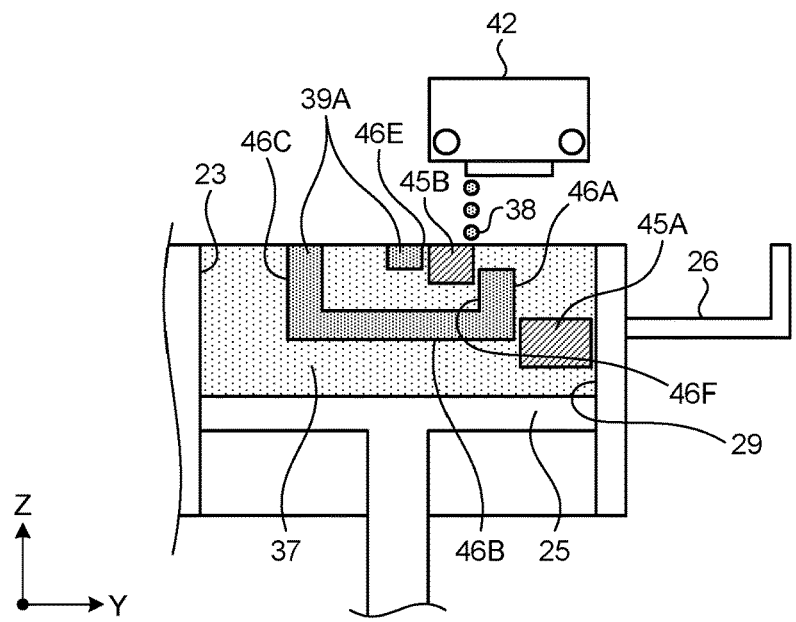
FIG. 21 is a diagram illustrating the process of forming the 3D object, the first auxiliary object, and the second auxiliary object according to the fourth implementation example of the embodiment.
Figure 22:
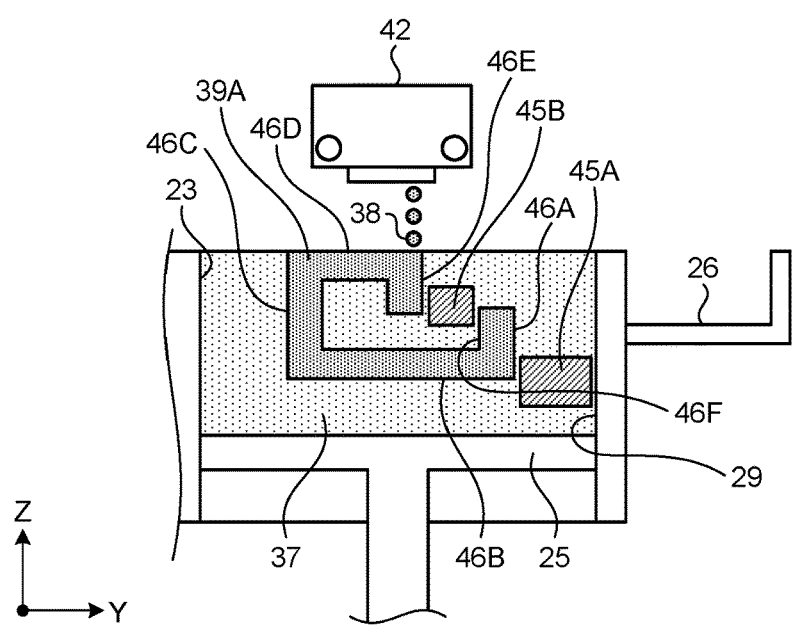
FIG. 22 is a diagram illustrating the process of forming the 3D object, the first auxiliary object, and the second auxiliary object according to the fourth implementation example of the embodiment.

FIG. 18 illustrates a state where forming the first auxiliary object 45A is started. FIG. 19 illustrates a state where forming the 3D object 39A is started and forming the first auxiliary object 45A is in progress. FIG. 20 illustrates a state where the first auxiliary object 45A has been formed, forming the 3D object 39A is in progress, and forming the second auxiliary object 45B is started. FIG. 21 illustrates a state where forming the 3D object 39A and the second auxiliary object 45B is in progress. Referring to FIG. 21, a part, which includes the fifth surface 46E, of the 3D object 39A is formed on the left of the second auxiliary object 45B. FIG. 22 illustrates a state where the 3D object 39A and the second auxiliary object 45B have been formed.

The first auxiliary object 45A is formed between the first surface 46A of the 3D object 39A and the wall surface 29 of the build chamber 23. The second auxiliary object 45B is formed between the fifth surface 46E and the sixth surface 46F of the 3D object 39A. Thus, in the fourth implementation example, not only the first auxiliary object 45A is formed between the 3D object 39A and the wall surface 29 but also the second auxiliary object 45B is formed between the two parts of the 3D object 39A. The first auxiliary object 45A prevents displacement of the entire 3D object 39A. The second auxiliary object 45B prevents displacement of the part, which includes the fifth surface 46E, of the entire 3D object 39A. Forming the second auxiliary object 45B described above can be implemented by, for example, adding the criterion that a clearance between a plurality of parts belonging to the single 3D object 39A and adjacent to each other in the conveying direction (the Y direction) of the powder 37 be larger than a predetermined value to the above-described auxiliary forming criterion.

Fifth Implementation Example

FIG. 23 to FIG. 26 are diagrams illustrating a process of forming the 3D object 39A and the auxiliary object 45 according to a fifth implementation example of the embodiment.

Figure 23:
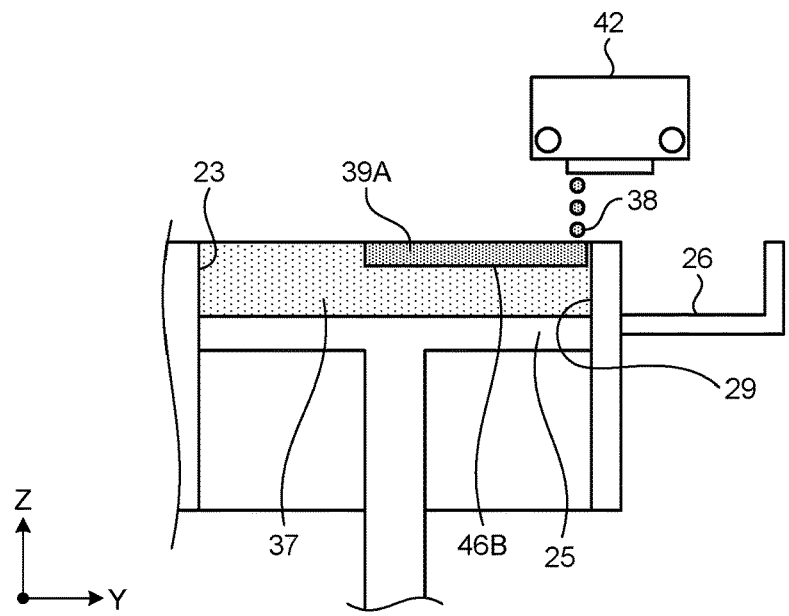
FIG. 23 is a diagram illustrating a process of forming the 3D object and the auxiliary object according to a fifth implementation example of the embodiment.
Figure 24:
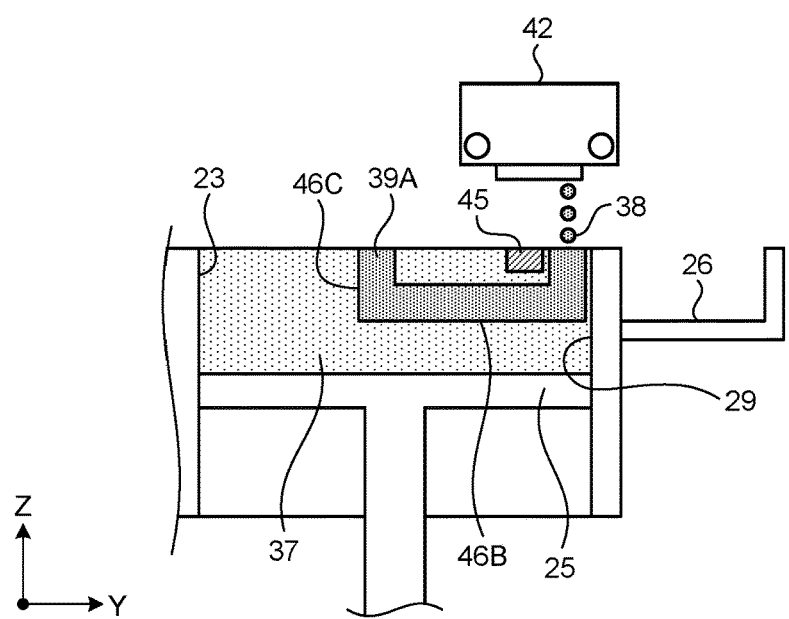
FIG. 24 is a diagram illustrating the process of forming the 3D object and the auxiliary object according to the fifth implementation example of the embodiment.
Figure 25:
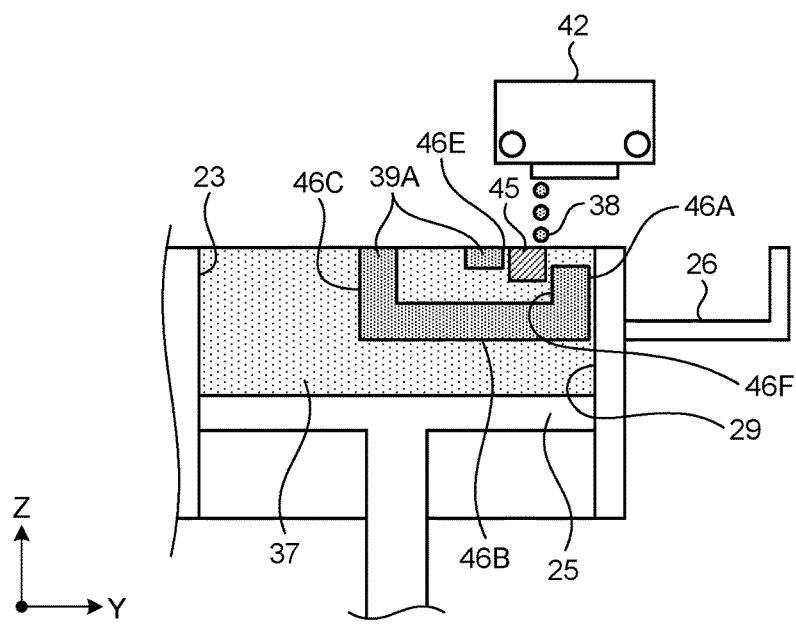
FIG. 25 is a diagram illustrating the process of forming the 3D object and the auxiliary object according to the fifth implementation example of the embodiment.
Figure 26:
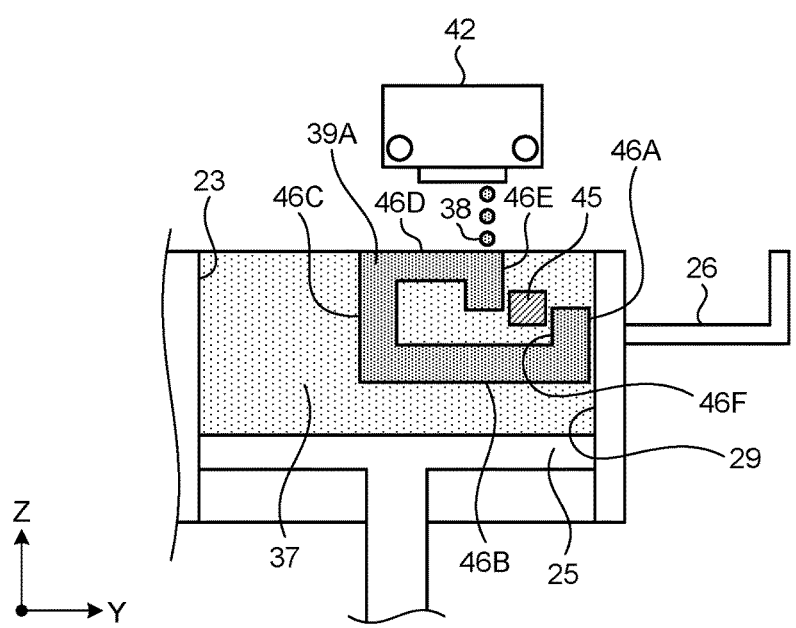
FIG. 26 is a diagram illustrating the process of forming the 3D object and the auxiliary object according to the fifth implementation example of the embodiment.

FIG. 23 illustrates a state where forming the 3D object 39A is started. FIG. 24 illustrates a state where forming the 3D object 39A is in progress and forming the auxiliary object 45 is started. FIG. 25 illustrates a state where forming the 3D object 39A and the auxiliary object 45 is in progress. FIG. 26 illustrates a state where the 3D object 39A and the auxiliary object 45 have been formed.

The fifth implementation example differs from the fourth implementation example in that the auxiliary object 45 is not formed between the first surface 46A of the 3D object 39A and the wall surface 29 of the build chamber 23. This is because, in the fifth implementation example, the clearance between the first surface 46A and the wall surface 29 is equal to or smaller than a predetermined value, and therefore displacement of the entire 3D object 39A is less likely to occur. By preventing forming the auxiliary object 45 when displacement of the 3D object 39A is less likely to occur as described above, consumptions of the powder 37 and the binder liquid 38 can be reduced.

Sixth Implementation Example

Figure 27:
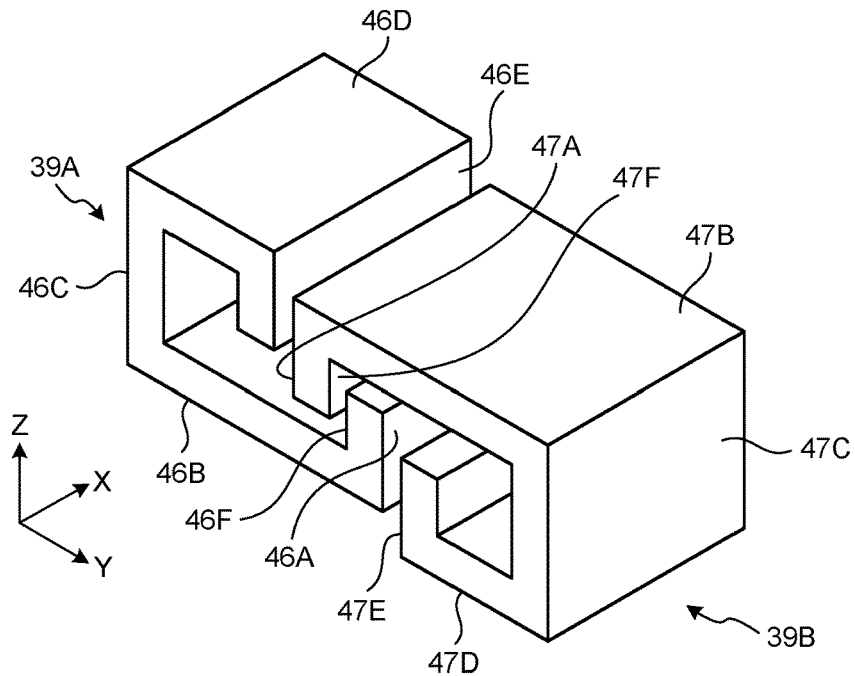
FIG. 27 is a diagram illustrating a first 3D object and a second 3D object according to a sixth implementation example of the embodiment.

FIG. 27 is a diagram illustrating the first 3D object 39A and a second 3D object 39B according to a sixth implementation example of the embodiment. The first 3D object 39A includes the first surface 46A, the second surface 46B, the third surface 46C, the fourth surface 46D, the fifth surface 46E, and the sixth surface 46F. The second 3D object 39B includes a first surface 47A, a second surface 47B, a third surface 47C, a fourth surface 47D, a fifth surface 47E, and a sixth surface 47F.

Figure 28:
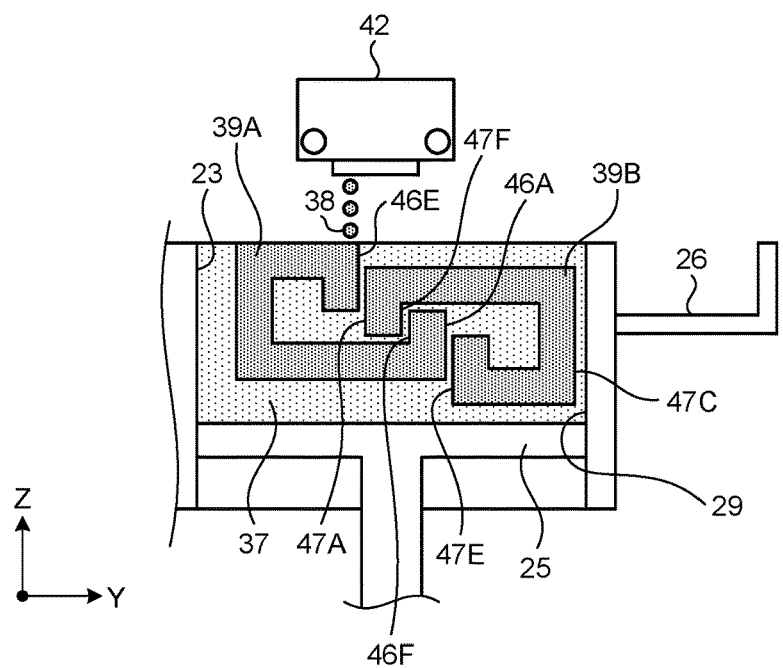
FIG. 28 is a diagram illustrating a process of forming the first 3D object and the second 3D object according to the sixth implementation example of the embodiment.

FIG. 28 is a diagram illustrating a process of forming the first 3D object 39A and the second 3D object 39B according to the sixth implementation example of the embodiment. Referring to FIG. 28, the auxiliary object 45 is not formed. The reason therefor is as follows. In the sixth implementation example, each of a clearance between the third surface 47C of the second 3D object 39B and the wall surface 29 of the build chamber 23, a clearance between the fifth surface 47E of the second 3D object 39B and the first surface 46A of the first 3D object 39A, a clearance between the sixth surface 46F of the first 3D object 39A and the sixth surface 47F of the second 3D object 39B, and a clearance between the first surface 47A of the second 3D object 39B and the fifth surface 46E of the first 3D object 39A is smaller than a predetermined value. Therefore, displacement of the entire 3D object 39A, the entire 3D object 39B, and parts of them are less likely to occur regardless of whether the auxiliary object 45 is formed. Thus, by detecting a condition where displacement is less likely to occur on the basis of structures of the 3D objects 39A and 39B, unnecessarily forming the auxiliary object 45 can be prevented.

As described above, according to the present embodiment, displacement of the 3D object 39 that can occur when the powder 37 is fed can be prevented.

The hardware configurations illustrated in FIG. 1 to FIG. 4 are illustrative only and not intended to be limiting on the embodiment. For example, whereas FIG. 1 illustrates an example where the single printing apparatus 11 and the single information processing terminal 12 are connected via the network 13, each of the number of the printing apparatuses 11 and the number of the information processing terminals 12 may be two or more. Whereas FIG. 5 illustrates an example where the controller 201 is implemented on the information processing terminal 12 that is independent of the printing apparatus 11, the controller 201 may alternatively be implemented on a processor or the like contained in the printing apparatus 11.

The configuration, in which the binder liquid 38 is ejected to solidify the powder 37, is illustrated in the embodiment described above; however, configuration for solidifying the powder 37 is not limited thereto. For example, a configuration that irradiates the powder 37 with laser may alternatively be employed.

According to an aspect of the present invention, it is advantageously possible to prevent displacement of a 3D object that can occur when powder is fed.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A three-dimensional printing system comprising:
 a reservoir configured to store powder, the powder to be solidified inside the reservoir to form a first three-dimensional object, the reservoir including a build stage;
 a feeder configured to move the powder from a first location in a first conveying direction, thereby feeding the powder to the reservoir;
 a solidifier configured to perform a process of solidifying the powder in the reservoir in accordance with a control signal; and
 a controller configured to generate the control signal so as to form, based on a threshold condition, a first auxiliary object between the first three-dimensional object and a wall surface of the reservoir and separate from the build stage, the wall surface being at a position downstream from the first three-dimensional object in the first conveying direction, the first three-dimensional object being an intended three-dimensional object and the auxiliary object being an object for reducing a displacement of the first three-dimensional object.

2. A three-dimensional printing system comprising:
 a reservoir configured to store powder, the powder to be solidified inside the reservoir to form a first three-dimensional object;
 a feeder configured to move the powder from a first location in a first conveying direction, thereby feeding the powder to the reservoir;
 a solidifier configured to perform a process of solidifying the powder in the reservoir in accordance with a control signal; and
 a controller configured to generate the control signal so as to form a first auxiliary object between the first three-dimensional object and a wall surface of the reservoir, the wall surface being at a position downstream from the first three-dimensional object in the first conveying direction, wherein the controller generates the control signal so as to form a second auxiliary object between a first part and a second part, when a clearance between the first part and the second part is larger than a threshold value, the first part and the second part being adjacent to each other in the first conveying direction and belonging to the first three-dimensional object.

3. The three-dimensional printing system according to claim 1, wherein when the first three-dimensional object and a second three-dimensional object adjacent to the first three-dimensional object in the first conveying direction are to be formed, the controller generates the control signal so as not to form a second auxiliary object when a clearance between a part belonging to the first three-dimensional object and a part belonging to the second three-dimensional object is smaller than a threshold value.

4. The three-dimensional printing system according to claim 1, wherein the solidifier solidifies the powder by ejecting, onto the powder stored in the reservoir, a binder liquid that joins the powder.

5. The three-dimensional printing system according to claim 1, further comprising a compressor that compresses the powder in the reservoir.

6. The three-dimensional printing system according to claim 1, further comprising a vibrator that vibrates the powder in the reservoir.

7. A control device for controlling a three-dimensional printing apparatus including
 a reservoir configured to store powder, the powder to be solidified inside the reservoir to form a three-dimensional object, the reservoir including a build stage,
 a feeder configured to move the powder from a first location in a first conveying direction, thereby feeding the powder to the reservoir, and
 a solidifier configured to perform a process of solidifying the powder in the reservoir in accordance with a control signal,
 the control device comprising a unit configured to generate the control signal so as to form, based on a threshold condition, an auxiliary object between the three-dimensional object and a wall surface of the reservoir and separate from the build stage, the wall surface being at a position downstream from the three-dimensional object in the first conveying direction, the three-dimensional object being an intended three-dimensional object and the auxiliary object being an object for reducing a displacement of the three-dimensional object.

8. The three-dimensional printing system of claim 1, wherein the reservoir includes a feed chamber and a build chamber and the controller is configured to generate the control signal so as to form the first auxiliary object between the first three-dimensional object and a wall surface of the build chamber.

9. The three-dimensional printing system of claim 1, wherein the controller is configured to generate the control signal so as to form a second auxiliary object after initialization of the formation of the first three-dimensional object.

10. The three-dimensional printing system of claim 9, wherein the controller is configured to generate the control signal so as to form the second auxiliary object during the formation of the first three-dimensional object.

11. The three-dimensional printing system of claim 1, wherein the controller is configured to generate the control signal so as to form the first auxiliary object before the formation of the first three-dimensional object.

12. The three-dimensional printing system of claim 1, wherein a height of the auxiliary object is less than a height of the reservoir.

13. The three-dimensional printing system of claim 12, wherein a height of unsolidified powder and the height of the auxiliary object together equal the height of the reservoir.

14. The three-dimensional printing system according to claim 1, wherein the controller generates the control signal so as to form the first auxiliary object when a clearance between the first three-dimensional object and the wall surface is larger than a threshold value.

15. The three-dimensional printing system according to claim 1, wherein the controller generates the control signal so as to provide a threshold clearance between the first three-dimensional object and the first auxiliary object.

16. The three-dimensional printing system according to claim 1, wherein the controller generates the control signal so as to provide a threshold clearance between the first auxiliary object and the wall surface.

17. The three-dimensional printing system according to claim 1, wherein the controller generates the control signal so as to position a lower end portion of the first auxiliary object closer to a bottom of the reservoir than a lower end portion of the first three-dimensional object is.

18. The three-dimensional printing system according to claim 17, wherein the controller generates the control signal so as to provide a threshold clearance between the lower end portion of the first auxiliary object and the bottom of the reservoir.

* * * * *